Feb. 14, 1967 R. HOLT 3,303,758

TEAR TAPE APPLYING MECHANISMS FOR WRAPPING MACHINES

Filed May 11, 1964 8 Sheets-Sheet 1

INVENTOR.
Ronald Holt

BY

ATTORNEY.

TEAR TAPE APPLYING MECHANISMS FOR WRAPPING MACHINES

Filed May 11, 1964 8 Sheets-Sheet 2

INVENTOR.
Ronald Holt
BY
[signature]
ATTORNEY.

Feb. 14, 1967 R. HOLT 3,303,758

TEAR TAPE APPLYING MECHANISMS FOR WRAPPING MACHINES

Filed May 11, 1964 8 Sheets-Sheet 3

INVENTOR.
Ronald Holt

BY [signature]

ATTORNEY.

TEAR TAPE APPLYING MECHANISMS FOR WRAPPING MACHINES

Filed May 11, 1964 8 Sheets-Sheet 4

INVENTOR.
Ronald Holt

BY Otto A. Earl

ATTORNEY.

INVENTOR.
Ronald Holt
BY
Otto A. Earl
ATTORNEY.

Feb. 14, 1967 R. HOLT 3,303,758

TEAR TAPE APPLYING MECHANISMS FOR WRAPPING MACHINES

Filed May 11, 1964 8 Sheets-Sheet 6

INVENTOR.
Ronald Holt

BY Otto A. Earl
ATTORNEY.

TEAR TAPE APPLYING MECHANISMS FOR WRAPPING MACHINES

Filed May 11, 1964 8 Sheets-Sheet 7

INVENTOR.
Ronald Holt

BY Otis A. Earl

ATTORNEY.

Feb. 14, 1967 R. HOLT 3,303,758

TEAR TAPE APPLYING MECHANISMS FOR WRAPPING MACHINES

Filed May 11, 1964 8 Sheets-Sheet 8

INVENTOR.
Ronald Holt
BY
[signature]
ATTORNEY.

United States Patent Office 3,303,758

Patented Feb. 14, 1967

3,303,758

TEAR TAPE APPLYING MECHANISMS FOR WRAPPING MACHINES

Ronald Holt, Battle Creek, Mich., assignor to Battle Creek Packaging Machines, Inc., Battle Creek, Mich.

Filed May 11, 1964, Ser. No. 366,349
14 Claims. (Cl. 93—1)

This invention relates to improvements in tear tape applying machanisms for wrapping machines. The principal objects of this invention are:

First, to provide mechanism for advancing and positioning a strip of tear tape material transversely of an advancing web of wrapping material and applying the tape to the web in correctly registered relation to wrapper sheets to be cut from the web, and to apply the tape to the web as the web is moving.

Second, to provide mechanism for intermittently pulling an adjustably predetermined length of tear tape from a supply roll across an adhesive applying roll or device while a previously adhesive coated strip is applied to a wrapper web, interrupting the application of adhesive and cutting the tape in a nonadhesive coated area and projecting the leading end of the supply tape into a position to be gripped and pulled into position for applying to the web on the succeeding cycle of the mechanism.

Third, to provide a novel arrangement of adjustable synchronizing drive connections which permit the length of tear tape to adjust for different packages, and for application to the wrapper web at different times in the wrapper feeding cycle so that the tear tape may be located at different preselected positions on the package.

Fourth, to provide a tape feeding mechanism that intermittently feeds an approximate but slight excess length of tape for each tear strip to the guides and adhesive applying and tear tape pulling and applying elements of the machine so that the length of tape for each successive and individual tear strip can be pulled rapidly and under continuous accurate control and tension in being advanced and applied to the web of wrapping material.

Other objects and advantages of the invention will be apparent from a consideration of the following description and claims. The drawings, of which there are eight sheets, illustrate a highly practical form of the tear tape and strip feeding and applying mechanism of the invention.

FIG. 1 is a fragmentary front elevational view of the wrapper web feeding and wrapper sheet cutting machine to which the tear tape applying mechanism of the invention is applied. The tear tape supply and feeding mechanism is omitted from this view, being supported in front of the wrapper feeding mechanism by the vertical plate shown in section in the middle of the view. The section is taken along the plane of the line 1—1 in FIG. 3.

The tear tape applying mechanism of the invention is designed for application to, or cooperation with the wrapper sheet cutting and web feeding mechanism of an automatic wrapping machine. The example illustrated shows the mechanism added as an attachment but obviously both the tear tape applying mechanism and the wrapper web feeding mechanism could be incorporated in or, built onto a single supporting frame. The mechanism is particularly useful in applying synthetic tape material to synthetic wrapper web material such as cellophane, polyethylene or polyolefin films, but is not necessarily limited to use with these materials. The several views are not shown at the same point in the operational cycle of the machine, the views being selected to best illustrate the mechanism particularly the several cams.

Figure 1:
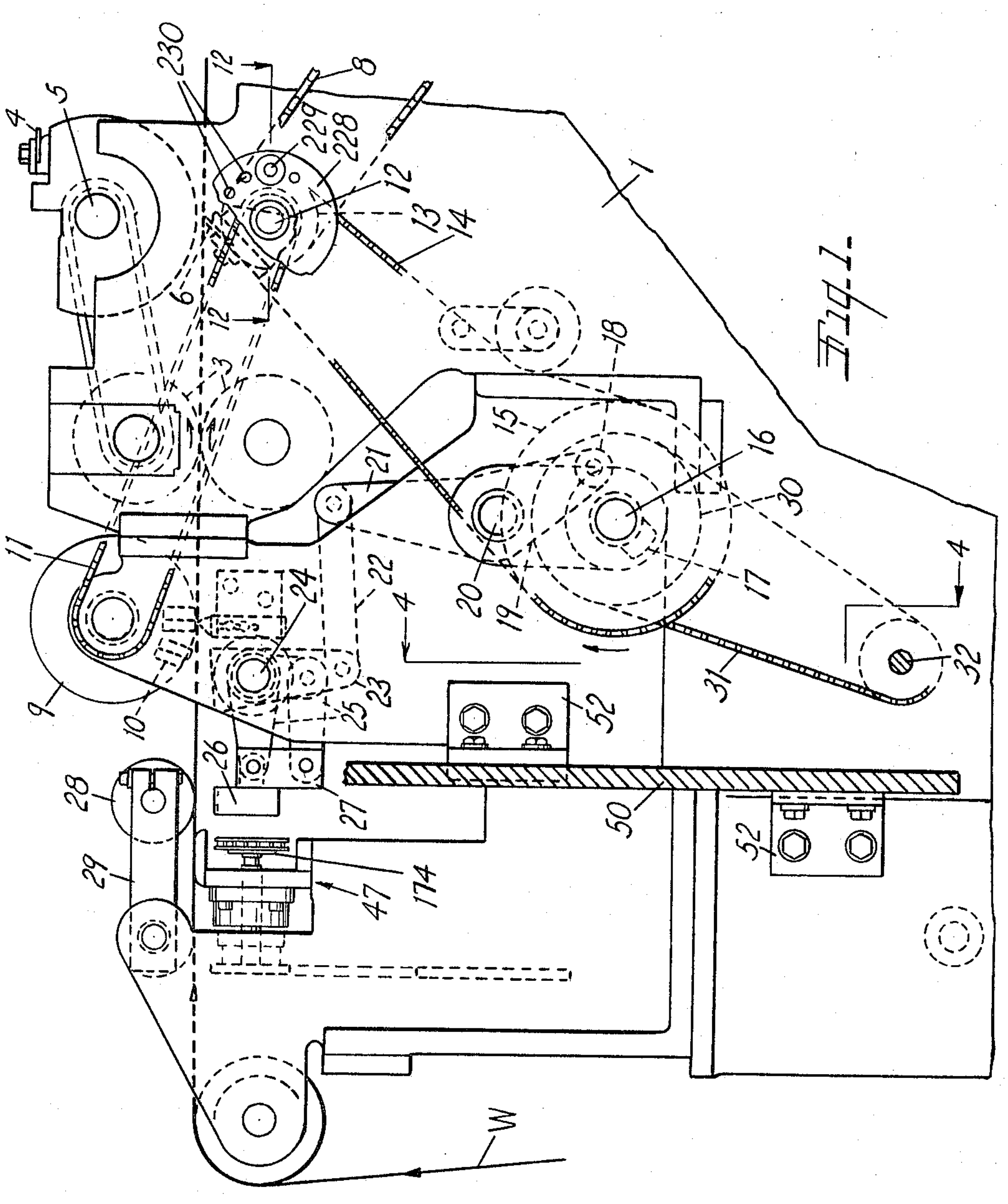
Figure 2:
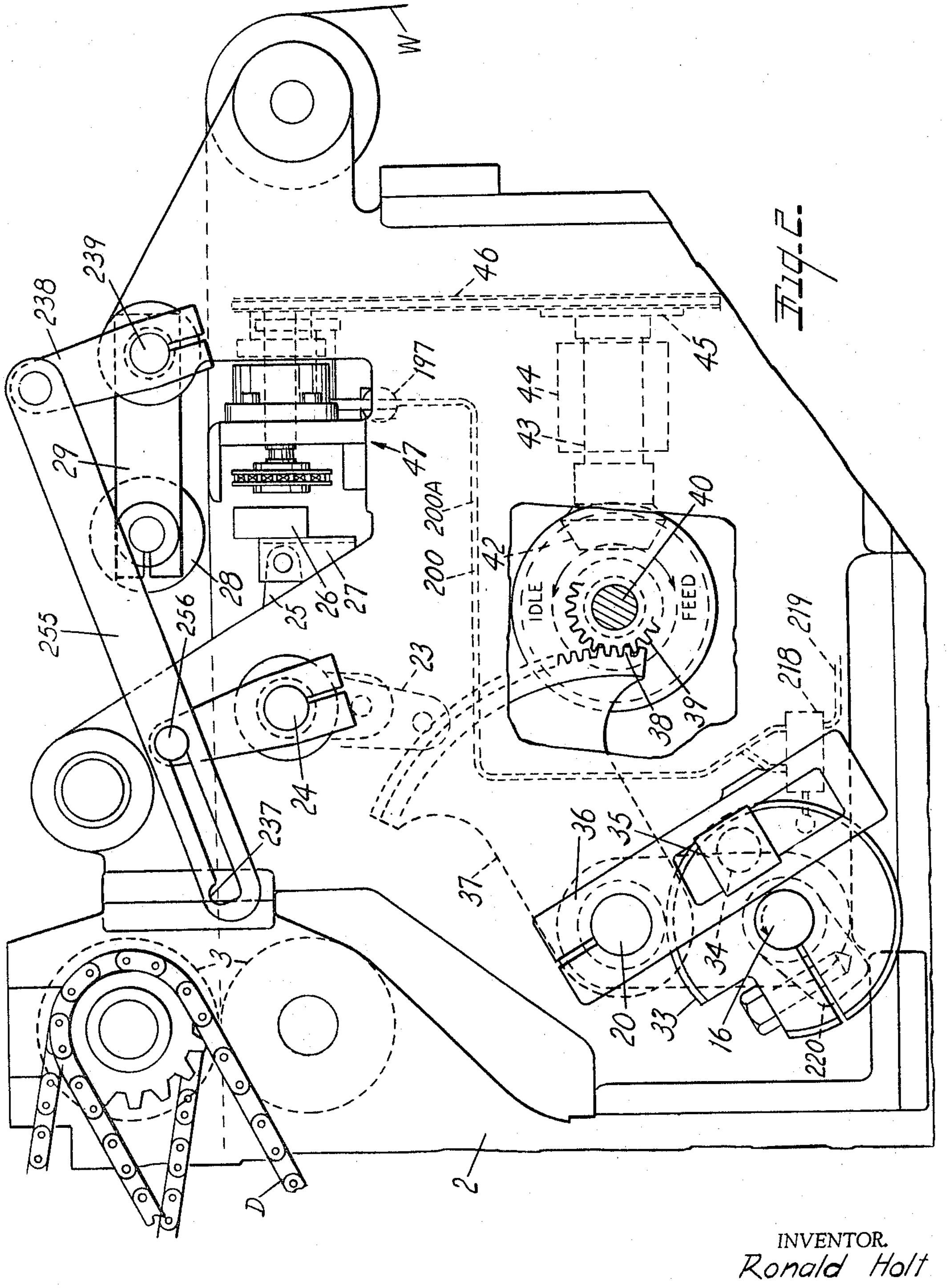
FIG. 2 is a fragmentary back side elevational view of the wrapper web feeding portion of the tear tape applier, parts being omitted and others being broken away to show drive connections.
Figure 3:
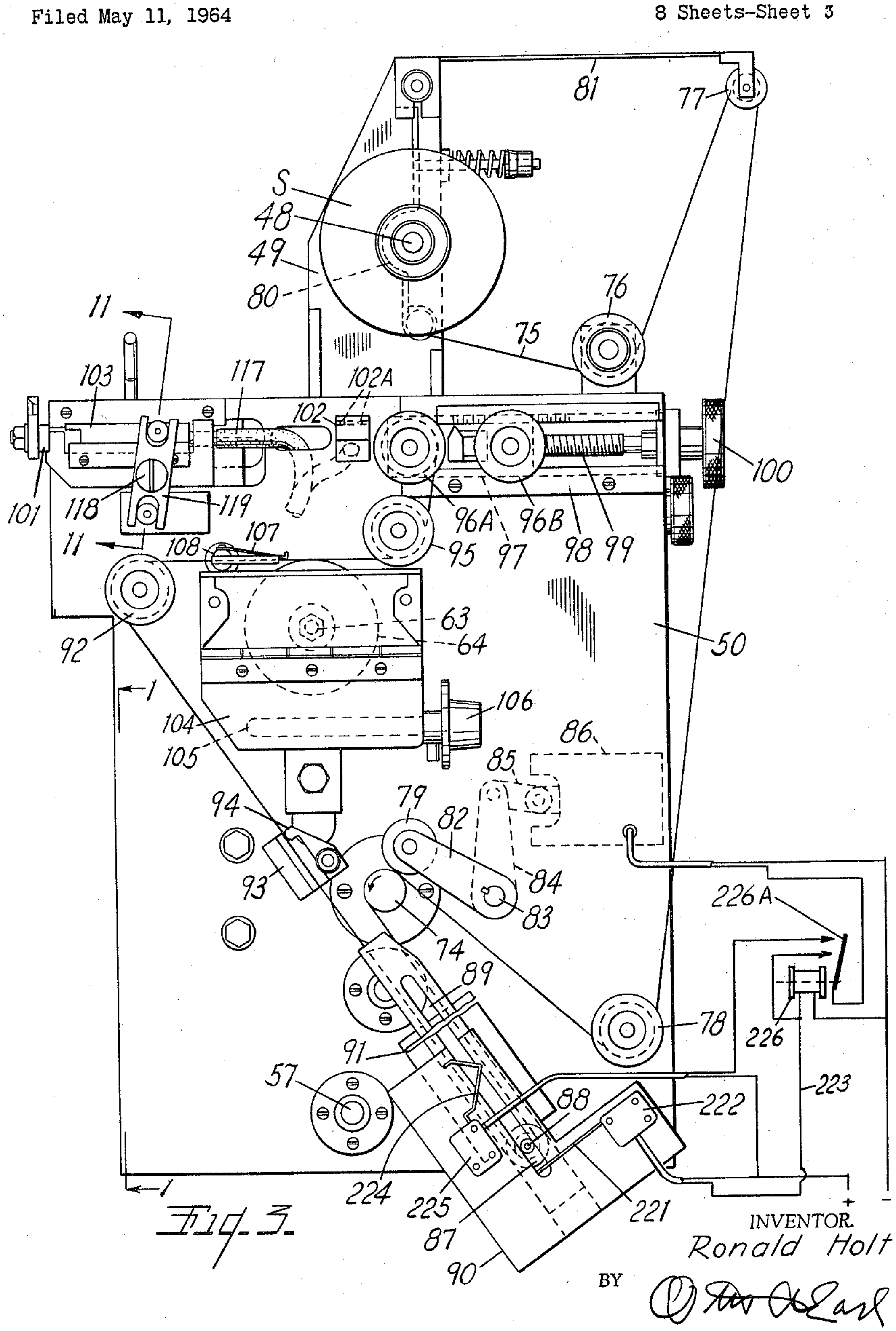
FIG. 3 is a fragmentary elevational view of the tear tape feeding, coating and forwarding portion of the mechanism, viewed from the back or infeeding side relative to the motion of the wrapper web to which the tape is to be applied.

As appears most clearly in FIGS. 1 and 2, the wrapper web feeding mechanism includes suitable side frame members or plates 1 and 2 which support feed rolls 3 for drawing in the web W of wrapping material and delivering the web to a rotating cutter blade 4 mounted on the shaft 5 and cooperative with a fixed or other cutter blade 6. A drive chain from the wrapping machine (not illustrated) to which the severed wrapper sheets are delivered is conventionally illustrated at 8. This synchronizes the wrapper web and sheet feed with the wrapping machine. Details of the driving connections to the feed rolls or the cutter shaft are only conventionally illustrated by the chain D in FIG. 2 as such drives are well known. An edge nicking roll 9 having angularly spaced short knives 10 may be driven by the chain 11 from the chain 8 as will be described.

Figure 9:
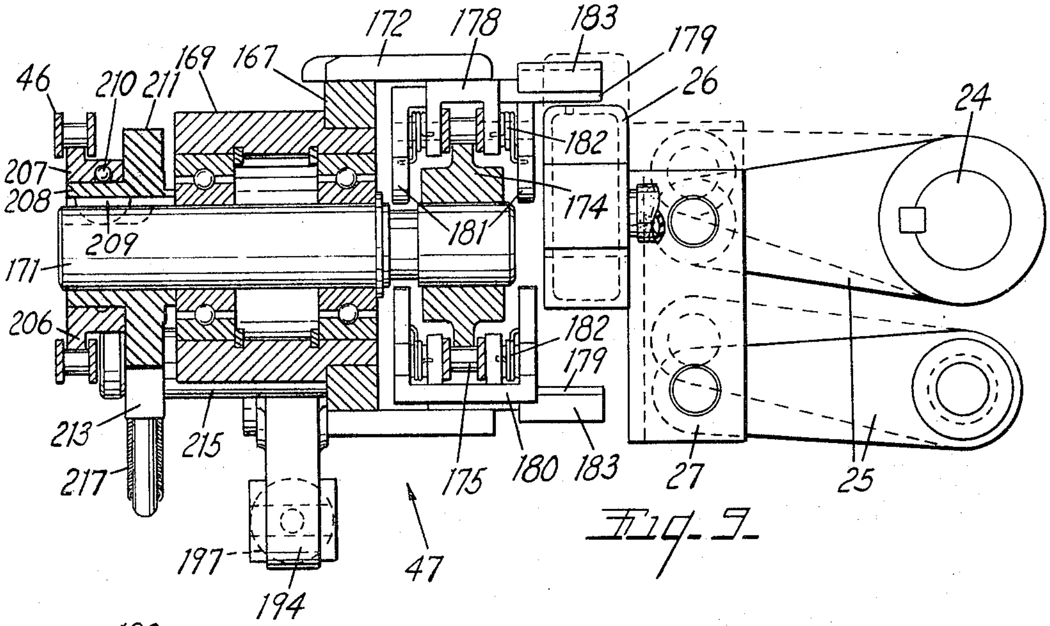
FIG. 9 is a fragmentary cross sectional view through the final tape pulling drive and positioning gripper taken along the plane of the line 9—9 in FIG. 7.
Figure 10:
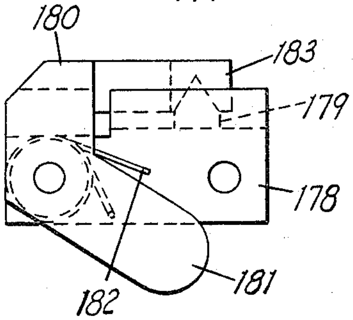
FIG. 10 is an enlarged rear side elevational view of the tear tape gripper and pull out element of the tear tape positioning portion of the invention.

The chain 8 rotates a sprocket on shaft 12 that is adjustably connectable to a sprocket 13 as will be described later. A chain 14 from the sprocket extends rearwardly and downwardly to a sprocket 15 on the main shaft 16. A cam 17 on the shaft 16 actuates the follower roll 18 on the crank arm 19 to oscillate the crank freely on the rock shaft 20 once in each sheet feeding and cutting cycle of the machine. Crank arm 21 connected to crank 19 is connected by a link 22 to a crank 23 on rockshaft 24 to vertically oscillate arms 25. (See FIGS. 1, 7 and 9.) The arms 25 support a presser bar 26 having a vacuum chamber therein as will be more particularly described. Parallel arms 27 hold the presser bar parallel to the underside of a backing roll 28 rotatably and swingably mounted by the arms 29 over the infeeding web and presser bar.

A sprocket 30 on shaft 16 drives a chain 31 and shaft 32 which projects forwardly from the front frame 1 to drive the tape feeding and cutting mechanism as will be described. On the back side of the machine (see FIG. 2) the shaft 16 continuously rotates a wheel 33 having a crank pin 34 and block 35 that cooperate in a Scotch yoke drive with the slotted crank arm 36. The arm 36 oscillates the cross shaft 20 on which is mounted a sector gear 37 having teeth 38 meshing with the pinion 39. The pinion 39 is mounted on a stub shaft 40 and carries a first bevel gear 42. The bevel gear 42 is carried by a short shaft 43 supported in a bracket 44. A sprocket 45 on the shaft 43 drives a chain 46 that extends upwardly to drive the tape forwarding mechanism generally indicated at 47 as will be described in greater detail presently in connection with FIGS. 7, 8 and 9. The arrangement of the Scotch yoke drive 34–36 is such that each rotation of the continuously driven main shaft 16 raises the sector 37–38 during approximately 240° of rotation of shaft 16 and returns the sector during the remaining 120° of rotation. This occurs once each wrapper feeding cycle of the feed rolls 3. The sprocket 45 and chain 46 accordingly move in a tear tape advancing cycle corresponding to clockwise rotation of pinion 39 during 240° of the wrapper feed cycle and retract at a faster rate during 120° of the cycle.

*Tear tape feed*

The tear tape material is supplied in a continuous coil from the spool S mounted on a spindle 48 carried by the upstanding bracket 49 on top of the tape feed support plate 50 (see FIGS. 1 and 3–6). The tape feeding and cut-off mechanism is also driven in timed relation to the wrapper feed cycle of the wrapping machine by the previously described shaft 16 driving chain 31 and sprocket 51 on shaft 32. Plate 50 is connected to the side of the front frame 1 of the wrapper feeder by brackets 52. The shaft 32 is supported in a bearing bracket 53 and continuously drives two bevel gears 54 and 55. Bevel gear 55 drives gear 56 on a short shaft 57 perpendicular to plate 50. This shaft 57 has one sprocket 58 driving chain 59 to a pair of interconnected speed and direction change sprockets and gears 60 that drive chain 61 and sprocket 62 in the direction indicated in FIG. 4. This drives shaft 63 extending through the plate 50 to continuously rotate the adhesive wax applicator disc 64. The size of the gears and sprockets 60 may be changed to obtain the desired peripheral speed as will be described.

Shaft 57 also drives sprocket 65 and chain 66 to sprocket 67 and pinion 68. Pinion 68 meshes with a pinion 69 mounted on a swingable stub shaft 70 carried by the plate 71. Plate 71 is angularly adjustable about the axis of shaft 72 that is driven by pinion 73 meshing with pinion 69. The adjustable nature of shaft 70 on plate 71 permits gears or pinions 68, 69 and 73 to be changed to change the speed of shaft 72. Shaft 72 extends through the plate 50 and drives a tape feed roll 74 on the back side of the plate. The tape material 75 is drawn off of spool S over guide rollers 76, 77 and 78 whenever a pressure backing roll 79 is pressed down on feed roll 74. 80 is a drag brake on supply spool S and roll 77 is yieldably supported on spring arm 81. Backing or pressure roll 79 is mounted on a yoke 82 that is tiltable by a rock shaft 83 to raise the backing roll and stop the tape feed. The shaft 83 extends through the plate 50 and has a crank arm 84 on the front of the plate (see FIG. 4) that is actuated by a link 85 from a solenoid 86 as will be explained.

Turning to a consideration of the path of the tear tape material on the back side of plate 50, attention is directed to FIGS. 3, 5, 6 and 11. After passing over the feed roll 74 the tape is directed downwardly around a sliding or dancer roll 87. The roll has an axle pin 88 that is slidable up and down in inclined slot 89 in a guide arm having spaced side plates 90. The length of the guide arm is indefinite as is indicated at the break out at 91 and is sufficient to insure a sufficient length of tape material looped around the dancer roll and back to a guide roll 92 to equal the longest length of tear tape strip to be used on the machine. A friction block 93 and spring loaded pressure finger 94 provide an even tension on the tape approaching the guide roll 92. After passing roll 92 the tape is directed outwardly from the wrapping machine and over the upper periphery of the adhesive applying disc 64, moving in the same direction as the surface of the disc to a fixed guide roll 95 and up around either one of two adjustable strip length setting rolls 96A or 96B. The rolls 96A and B are mounted on a slide block 97 adjustable in the gibs 98 by screw 99 and hand nut 100. The alternate rolls 96 and their adjustment are used to determine and fix the length of tape material from the adhesive disc 64 to a shear block 101 located near the inner edge of plate 50 as will be described. The tape material passes horizontally over a fixed guide block 102 and a moving guide and gripper block 103 to the shear block as will be described. Block 102 may have suction ports 102A therein to retain the free end of the tape material in place and prevent sagging onto wheel 64.

The adhesive disc 64 dips into an adhesive or wax pot 104 on its under side to carry wax as an adhesive to the tape material. The pot has a heater 105 regulated by the control 106 to keep the wax at the right consistency. Since it is not desired to wax all of the tape material, a lift finger 107 carried by the rock shaft or pin 108 is positioned under the tape just ahead of the waxer disc 64. The finger 107 is rocked up as will be described to lift the tape material out of contact with the disk to leave an unwaxed or uncoated gap in the tape at the point at which the tape will be cut into individual tear tape strips. This keeps the shear block 101 clear of wax and leaves an unwaxed pull tab on the end of each tear tape.

The shear block 101 is carried at the front or inner end of a movable carrier block or plate 109 mounted by spacers 110 (see FIG. 11) on a slide plate 111. The plate slides on the main base plate 50 behind gibs or slide plates 112. The carrier block 109 in turn has retaining slides 113 fixed thereto that support and guide the gripper block 103. The block 103 is hollow forming a vacuum chamber 114 and has a shallow guide groove 115 in its top with a plurality of suction ports 116 formed through the bottom of the groove to the vacuum chamber. A connection to a suitable vacuum pump or source of suction is indicated by the flexible hose 117 that also connects to the suction ports in the holding block 102.

The carrier block 109 carries a screw 118 on its side forming a moving pivot for a lever 119. The upper end of the lever is notched at 120 to drivingly receive a pin or roller 121 projecting from the side of the guide and gripper block 109. At its lower end, the lever is notched at 122 to receive the fixed pin or roller 123 supported on a spacer 124 from the main support plate 50. The carrier block is reciprocated horizontally, as will be described in greater detail presently, to move it toward and away from the side of the wrapping machine through a stroke of the order of half an inch. The gripper block 103 being carried by the carrier block moves the same distance but being itself slidable on the carrier block and acted upon by the tilting motion of lever 119, moves an additional distance which is somewhat less in magnitude than the base movement of the carrier block. The added increment of movement of gripper block 103 projects the newly cut end of the tear tape material beyond the end of the carrier block and the shear block where the end can be picked up and advanced to the web as will be described.

Figure 4:
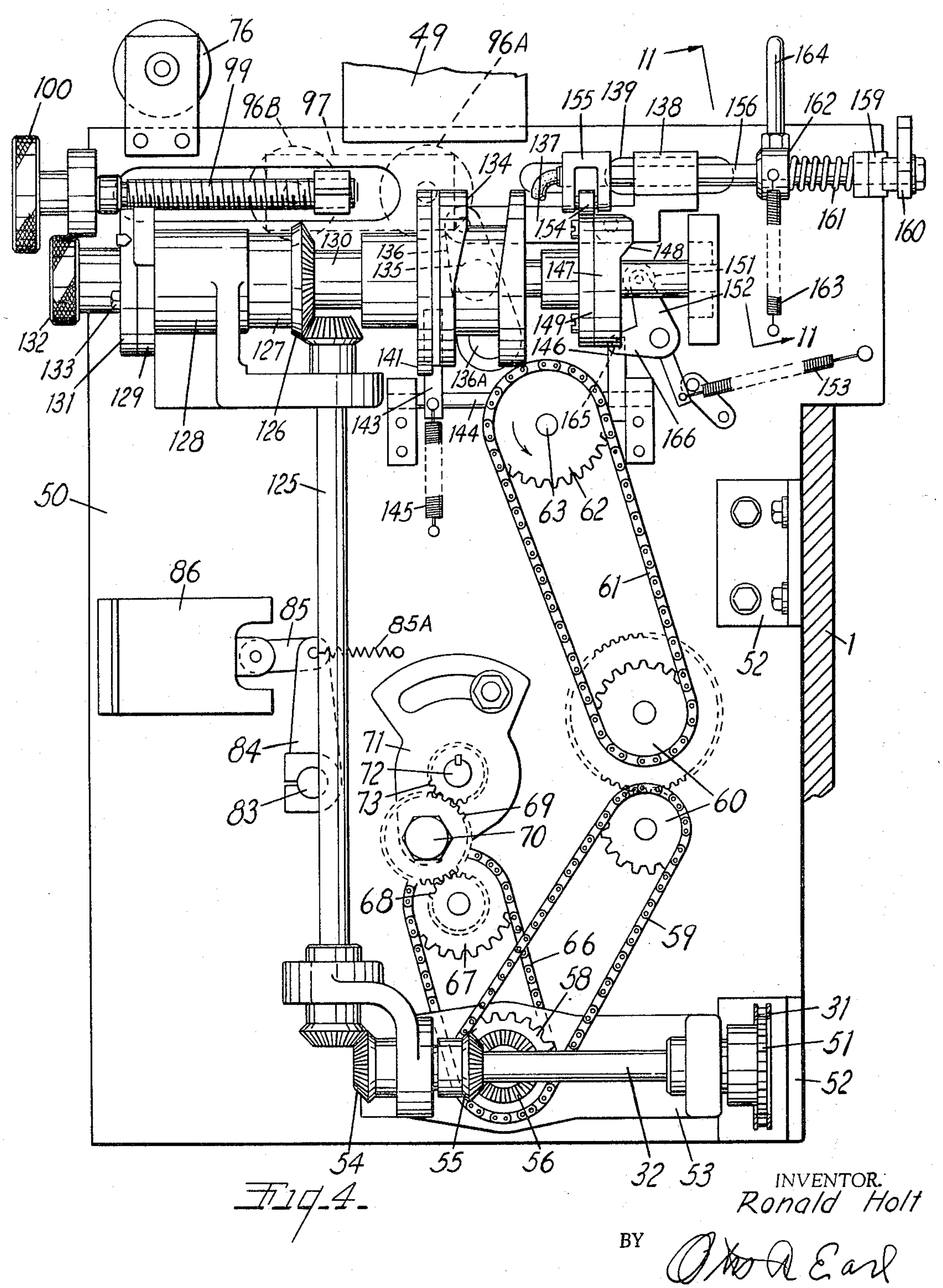
FIG. 4 is a fragmentary elevational view of the structure shown in FIG. 3, viewed from the opposite side or front or out-feeding side relative to the motion of the wrapper web. The view is taken along the plane of the line 4—4 in FIG. 1.
Figures 5, 13:
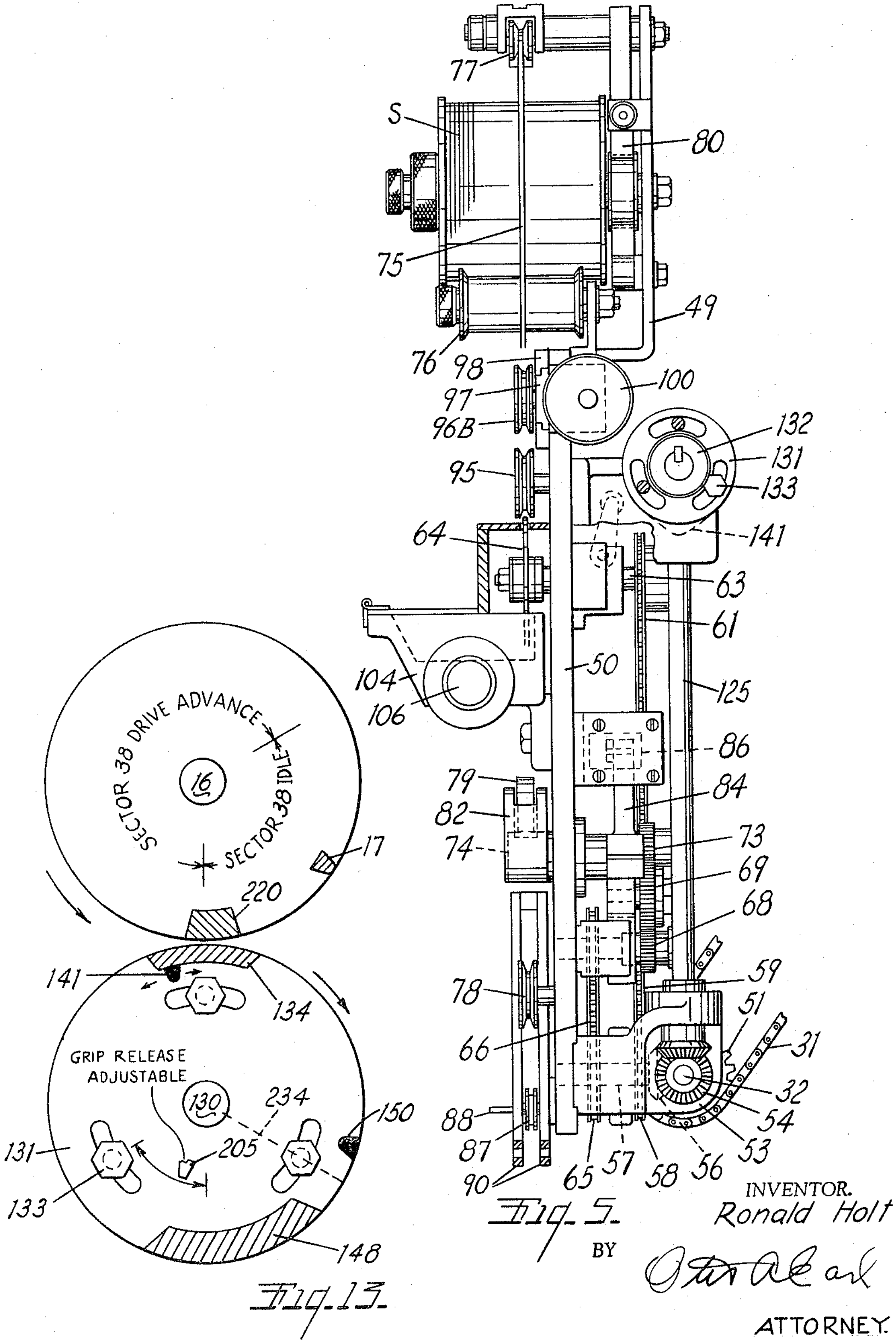
FIG. 5 is a fragmentary front or edge elevational view of the tape feeding and cutting mechanism shown in FIGS. 3 and 4 with parts broken away in cross section.
FIG. 13 is a schematic cam cycle and timing diagram of the tear tape applying mechanism.
Figures 6, 11:
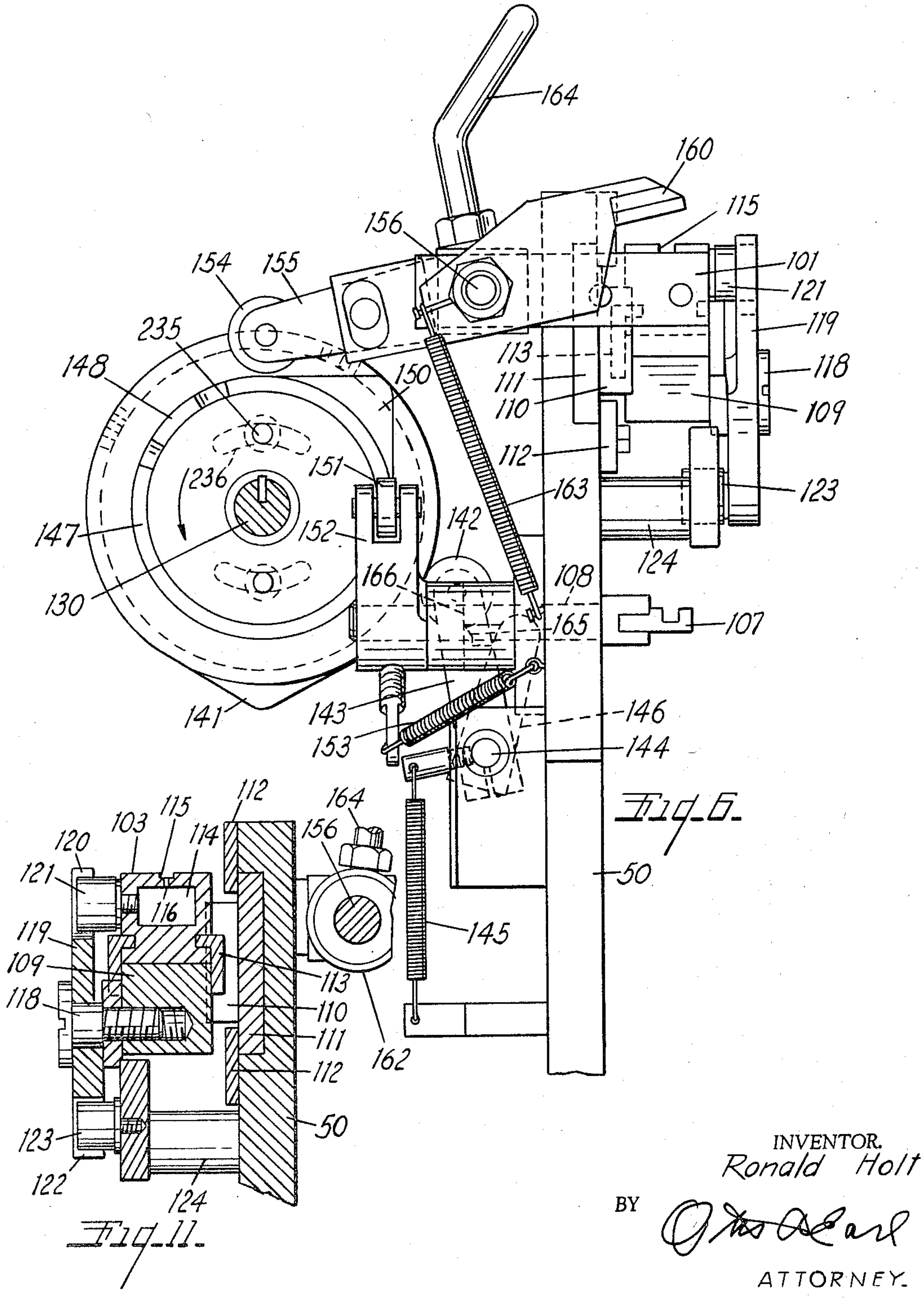
FIG. 6 is a fragmentary rear elevational view of the tape feeding and cutting mechanism taken from the opposite side from FIG. 5.
FIG. 11 is a fragmentary cross sectional view through the tape end advancing slides and associated supporting and driving connections taken along the plane of the lines 11—11 in FIGS. 3 and 4.

The feeding and cutting of the tape is effected in part by the forwarding mechanism 47 that intermittently picks up the projecting end of the tape and pulls a tear strip length rapidly from around the rollers 96, 95, 92 and 87, and by the cutter drive and end extending mechanism mounted on the front of plate 50 as appears in FIGS. 4, 5 and 6. The bevel gear 54 continuously rotates upright shaft 125 which in turn drives bevel gear 126 formed on a sleeve 127 journaled in bracket 128. The sleeve has a flange 129 that is angularly adjustably connected to cam shaft 130 by the plate 131 on the shaft and hand wheel 132. Clamp screws 133 hold the sleeve and shaft in adjusted position. The shaft 130 has a first axially facing annular box cam with a lift 134 that actuates follower roll 135 on lever 136. The lever is pivoted to plate 50 at 136A and is connected by a link 137 to a feed block 138. The block projects through a slot 139 in the plate 50 and is connected to the slide plate 111 of the carrier block 109 to reciprocate the latter.

A second radial cam 140 positioned at the end of the box cam 134 has a radial lift 141 that acts on follower 142 carried by lever 143 on the rock shaft 144. Spring 145 biases the lever and rock shaft in a counterclockwise direction in FIG. 6. The rock shaft 144 operates a release trip lever 146 to be described.

To the right of cams 134 and 140 in FIG. 4 or toward the inner side of plate 50, shaft 130 carries another axially facing cam 147 having a lift 148 and a radial cam 149 having a lift 150. Cam 147 and lift 148 actuate the follower 151 on lever 152 to rock previously described shaft 108 extending through the plate 50 to lift arm 107 to raise the in-feeding tape off of wax applying disk 64. Spring 153 biases the lever, shaft and pick-up finger toward tape lowering position. Cam 149 and lift 150 actuate follower 154 on lever 155 which is connected to cut-off rock shaft 156. Cut-off shaft 156 is axially fixedly carried by the drive block 138 and rotatably supported in bearing block 159 so the shaft reciprocates with the tape carrier block 109 and fixed shear block 101. An oscillating knife 160 fixed on the end of the shaft cooperates with the fixed shear block 101 to cut off the tear strip lengths of the tape material. A spring 161 positioned around shaft 156 between the bearing block 149 and collar 162 on the shaft urges the oscillating blade into shearing engagement with fixed block 101 and moves with the carrier block 109 from its inwardly projected position toward the web feeding mechanism. A spring 163 urges the cut-off rock shaft to blade open position. Handle or rod 164 permits manual operation of the cut-off knife.

When the lever 152 is rocked clockwise in FIG. 4 by cam 148 to raise the lift finger 107, spring 145 rocks shaft 144 and trip lever 146 so that pin 165 moves under stop arm 166 on lever 152 and prevents lowering motion of the pick-up finger until cam 141 retracts shaft 144 and lever 146.

*Tear strip pick up and forwarding mechanism*

The severed and waxed individual tear tape strips are picked up and advanced across the presser bar by the assembly 47 shown in FIGS. 7 to 10 and 12. A cross plate 167 supported on the frame members 1 and 2 carries bearings 168 and 169 for shafts 170 and 171. It also carries a guide bar 172 that supports the in-feeding web of wrapping material over the presser bar 26. An idler sprocket 173 on shaft 170 and a drive sprocket 174 on shaft 171 carry the cross feed chain loop 175. The upper reach of chain 175 is supported on support rail 176 carried by spacers 177 on the cross plate. The chain 175 carries a pair of gripper blocks 178 (see FIGS. 7 and 10) located at halfway points on the chain and straddle the chain. The tops of the blocks are guided between the support rail 176 and the bottom of the cross plate 172. A fixed gripper jaw 179 on each block projects laterally over the presser block 26. A gripper yoke 180 is pivoted over the leading end of the gripper block and has depending cam engaging arms 181 on each side of the block 178. Coil springs 182 connected between the arms and the blocks bias the yokes downwardly or inwardly of the chain loop toward the blocks 178. A laterally projecting moveable gripper 183 projects laterally from each yoke over the fixed gripper jaws so that the springs normally hold the jaws in closed tape gripping position.

Slidably secured to the right or infeeding end of support rail 176 are two jaw opening cam dogs 184 that are positioned in the path of the arms 181. One bolt 185 connecting the front or inner end of the cam dogs slides in a horizontal slot 186 in the support rail 126. Another bolt 187 between the right or outer ends of the dogs slides in an angled slot 188 having a raised right end 189. A pin 190 projects from the rear opening dog 184 through a slot 191 in the cross plate. A roller 192 on the pin is received in slotted or yoke end 193 of release lever 194. The lever is pivoted at 195 on the cross plate 167 and is connected to the piston rod 196 of an air cylinder 197 supported on bracket 198. With the piston rod retracted by air accumulated through conduit 200 as in FIGS. 7 and 8, the dogs 184 are retracted toward the right so that the ends 199 of the dogs engage and raise the gripper operating arms 181 to open the jaw 183. Extension of the piston rod by reason of air pressure admitted to the cylinder 197 through conduit 200A advances the gripper operating dogs to the left with pin 187 being lowered in slot 188 so that springs 182 function to close jaw 183 on jaw 179.

Figure 7:
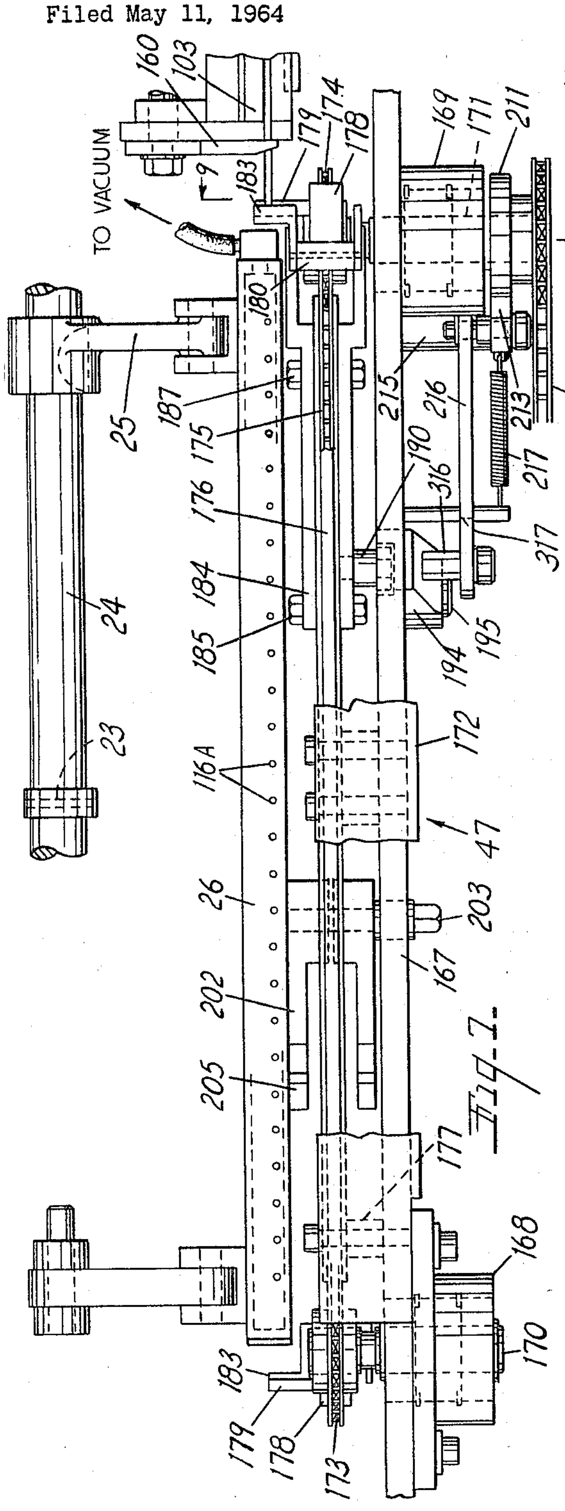
FIG. 7 is a fragmentary top plan view of the portion of the web feeding mechanism of the apparatus to which the tear tape applying mechanism is applied.
Figure 8:
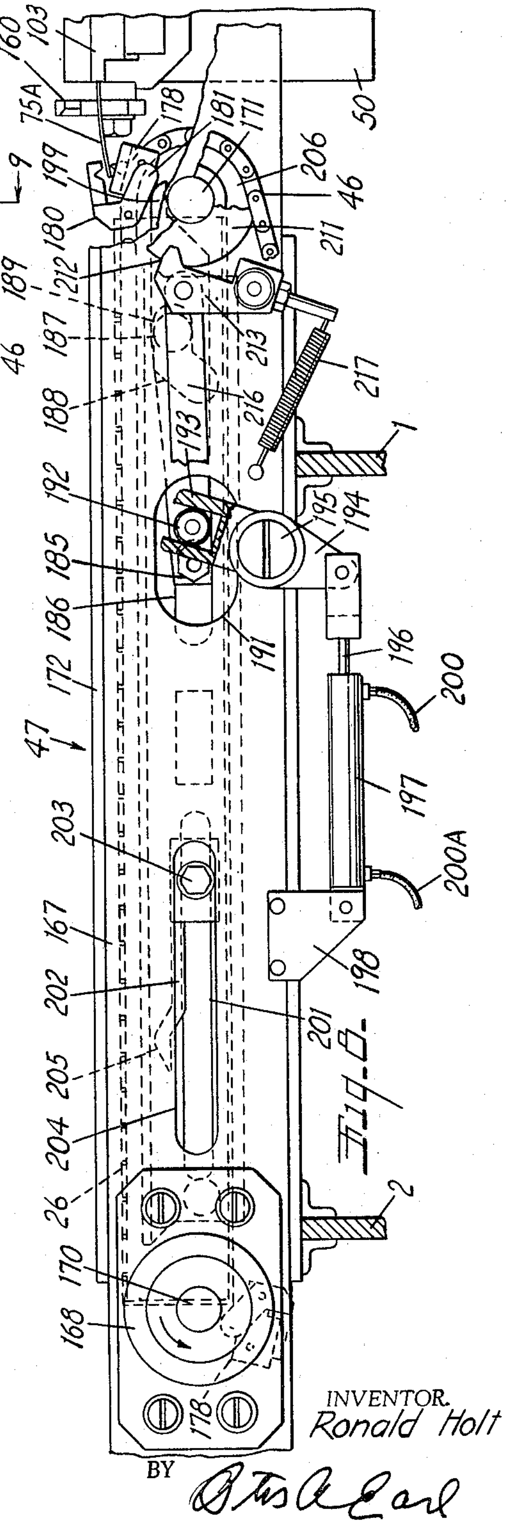
FIG. 8 is a fragmentary and projected rear elevational view of the structure shown in FIG. 7.

At the front or left end of the cross feed assembly in FIGS. 7 and 8, the support rail 176 defines a slot 201 in which jaw opening cam dogs 202 are slidably adjustably mounted and clamped by a bolt 203. A slot 204 in plate 167 permits access to the bolt so that the lifts 205 of the cam dogs may be positioned adjacent the left edge of the web of wrapping material being fed to the wrapping machine. The advancing gripper operating arms 181 strike these lifts and open the jaws 179–183 to release the leading end of the tear tape strip at the desired position. From a consideration of FIG. 7 it will be seen that the jaws 179–183 pull the strip over the vacuum ports 116A in the presser bar so the tear tape strip stops and is held with its freshly waxed side up as soon as the jaws open. The jaws, gripper blocks and cross feed chain continue their rotational cycle as will be described while the arms 25 and 27 actuated by cam 18 and lever 19–21 raise the presser bar and tear tape strip against the bottom of the moving web. The web picks up the tear tape strip by adhesion of the wax and carries the strip on to the wrapping machine.

The shaft 171 is cyclically driven by the previously described chain 46 from the sector oscillated gear 39. The chain 46 turns sprocket 206 (see FIGS. 8 and 9) having a hub 207 rotatable on the sleeve 208 keyed to the shaft at 209. Balls 210 positioned in angled slots or races in the hub form a one way clutch that lets the sprocket 206 reverse as sector 38 reverses without reversing the shaft. A locating or stop disk 211 on the sleeve has a notch 212 therein that receives the stop pawl or dog 213 pivoted at 214 on the spacer sleeve 215 from the plate 167. The dog 213 is connected by link 216 to the piston controlled arm or lever 194 and a spring 217 urges the dog towards engagement with the stop disk. A lost motion connection formed between pin 316 on arm 194 and link 216 by a slot 317 in the link permits pin 316 on arm 194 to move to the right when actuated by cylinder 197, the pawl 212 may ride the surface of disc 211 until the notch in the disc registers with the pawl and the pawl drops into the notch under the pull of spring 217.

The cylinder 197 that operates the gripper release lever 194, and also the stop pawl 213, is under the control of valve 218 (see FIG. 2) that admits air pressure to the conduits 200 and 200A from a suitable source 219. The valve is spring biased in one direction and is operated in each cycle of the apparatus by a cam 220 on the shaft 16. The function of the dog or pawl 213 and stop disk 211 is to stop the chain 175 with the gripper jaws 179–183 in open condition and in the right position to receive the leading end of the tear tape material projected by the holding block 103 as at 75A in FIG. 8. At the correct rotated position of shaft 16 in the wrapper feed cycle, cam 220 actuates valve 218 and cylinder 197 to retract link 216 and pawl 213, releasing disc 211 and shaft 171 for advance of chain 175 by advance of sector 38 driving through pinions 39 and 42, sprocket 45, chain 46 and clutch 207–210.

*Tear tape feed control*

As previously described, feed roll 74 and pressure backing roll advance approximately a tear tape strip length of the tear tape material during each cycle of the machine. Since the cross feed chain 175 and grippers 179–183 pull out an exact tear strip length very rapidly during the 240° rotation of the main shaft 16 that advances sector 37, 38 the drive ratio of gears 68, 69, 73 (see FIG. 4) is selected to drive the feed roll 74 at a speed that will deliver slightly more than an individual tear tape strip length of material into the loop formed by the sliding dancer roll 87 during each cycle of the machine to be sure that there is sufficient material available. This means that the dancer roll 87 will gradually descend in guide slots 89 until its axle 88 strikes the operating arm 221 (see FIG. 3) of an electric switch 222. The switch, acting through conductor 223 activates the solenoid 226 of switch 226A. Switch 226A activates solenoid 86 to draw in the link 85 and rock shaft 83 to raise the pressure roll 79 so that the normally constant feed of the tear tape material is interrupted. On the next tear strip forwarding cycle of grippers 179–183, the loop of material including the excess is drawn out and axle 88 strikes the operating arm 224 of switch 225 to open the switch. A holding circuit controlled by switch 225 keeps solenoid 226 energized so that the in-feed of tape material by roll 74 is stopped intermittently as determined by the number of times the length of excess feed of the material may be divided into the distance between the switch oprating arms 221 and 224. A spring 85A (see FIG. 4) reengages the tape feed when switch 225 is opened.

*Tear tape strip position adjustment*

Figure 12:
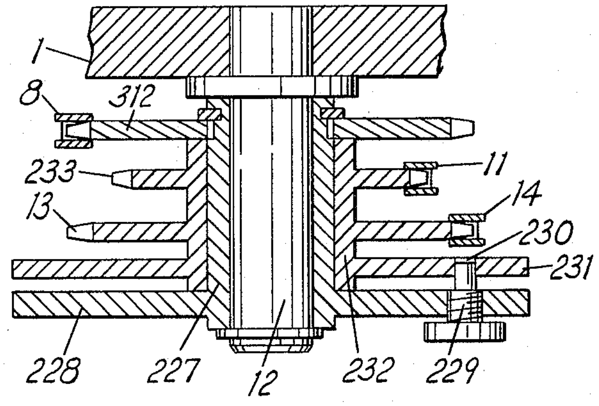
FIG. 12 is a fragmentary cross sectional view through the adjustable drive connection to the tear tape forwarding and applying and positioning mechanism of the machine taken along the plane of the line 12—12 in FIG. 1.

With reference to FIGS. 1 and 12, it will be seen that chain 8 drives the sprocket 312 drivingly connected to sleeve 227 on the stub shaft 12. Sleeve 227 carries an adjusting disk 228 with an axially extending pin 229 threaded therein and selectively engageable in a series of holes 230 in a driven disk 231 on the sleeve 232. Sleeve 232 carries the sprocket 13 from which the chain 14 and all parts of the tear tape applying mechanism are driven. Thus by advancing or retracting disk 228 relative to disk 231, the position in the wrapper feeding cycle at which the tape feeding mechanism will function can be changed to position the tear tape strip at any position along the length of the wrapper. Sleeve 227 also drives sprocket 233 that drives chain 11 to the knicking knife roll 9 so that the phase adjustment of the knicking roll is adjusted along with the rest of the tear tape applying mechanism.

*Cycle of operation*

FIG. 13 schematically illustrates the cycle of the machine in which the two main drive and control shafts are illustrated as each making one rotation per cycle of the machine. It should be recalled each of these shafts are angularly adjustable relative to the web feed of the wrapping machine to determine the position of application of the tear strip along the length of each wrapper sheet.

Starting as illustrated with the sector drive 38 ready to start a forwarding drive of the cross feed chain 175 and gripper blocks 178, one gripper block will be in the position illustrated in FIGS. 7 and 8 but the cam 220 will have actuated valve 218 to admit air to conduit 200A and extend piston rod 197. This advanced and lowered stop dogs 184 so the gripper 183 will be closed on the projected end of tear tape material 75A and stop pawl 213 will be retracted from the notch 212 in stop disk 211. Chain 175 advanced by one-way clutch 207–210 will pull the tape material rapidly across the suction ports 116 in presser bar 26 until the gripper is opened by engagement of arms 181 with release dogs 205 which are adjustable on the plate 176 to function when shaft 130 has rotated a variable distance to the starting point of the diagram. During this motion tear tape material is pulled rapidly from the loops around the dancer roll 87, raising the roll and pulling the tape over wax applying disk 64.

As soon as stop disk 211 and notch 212 clear the pawl or dog 213, cam 220 rotates out of engagement with valve 218 which reverses air supply to cylinder 197 so that dogs 184 and stop pawl 213 are retracted to open the jaw on the next gripper and stop the chain 175 as the next carrier block advances to receiving position.

At the start of the cycle cam 134 on shaft 130 will have advanced the carrier plate 109 and block 103 so the end of the tape material will be projected into the gripper. Shortly after the tape starts to pull out across presser bar 26, cam 141 actuates rockshaft 144 to release catch 165–166 so arm 152 and shaft 108 rock down under influence of spring 152 to lower the tape lifting arm 107 and bring the tape material into contact with the waxer disk. Shortly thereafter the cam 134 will retract both the carrier plate 109 and block 103, the tape material being pulled across the suction ports 116 in block 103 and ports 102A in block 102 during this cross feeding motion.

After the sector drive 38 has advanced to the end of its driving stroke corresponding to about 240° of rotation of both shafts as indicated by the dotted line at 234 in FIG. 13, forwarding motion of chain 175 will stop with the second gripper block in position to receive the next tape. Just prior to reaching this point cam shaft 130 will have advanced to cause cam 148 to act upon arm 152 and shaft 108 to raise the wax skipper arm 107 so for the last portion of the tape forwarding motion no wax will be applied to the tape. The cam lift 150 will then actuate follower 154 to operate the shear blade 160 across the fixed shear block 101, both the blade and block being in retracted position. The length of unwaxed tape material pulled past the disk 64 at the end of the cross feed motion may be adjusted by angularly adjusting cam plate 149 that carries lift 150 on the barrel 147 that carries cam lift 148. This adjustment is effected by loosening clamp screws 235 (FIGS. 4 and 6) and rotating plate 149 along the arcuate slots 236. Lift 148 holds arm 152 retracted until latch lever 146 on shaft 144 swings latch pin 166 into holding engagement with arm 165 to hold the tape material off of the wax disk.

During the approximate 120° final rotation of shafts 16 and 130 corresponding to retracting idle motion of sector 37–38, cross feed chain 175 is stationary. During this time cam 17 raises presser bar 26 to apply the newly severed tear strip to the underside of the advancing web W. Shortly prior to completion of the cycle cam lift 134 will readvance the carrier plate 109 and carrier block 103 with the differential movement of block 103 projecting the end of the tape material beyond the cut-off block 101 and into the waiting open jaws 179–183 of the next gripper block 178. The vacuum in ports 116 advances the end of the tape material pulling the short length of material over block 102. The vacuum ports 102A function only to prevent the tape material from slacking back onto waxer wheel 64 if the cross feed grippers 183 fail to grip the tape and advance it as the block 103 retracts.

As previously noted the selection of idler roll 96A or 96B for guiding the tape material, and the adjustment of the position of these rolls by screw 99 predetermines the length of tape material between wax applier disk 64 and retracted fixed shear block 101 to equal an even multiple of the length of material pulled out by the grippers and cross-feed chain 175 so the unwaxed or uncoated length of the material created by raising arm 107 registers with the shear block 101 each time the tape is advanced and cut off.

The angular adjustment of cam shaft 130 and the cams carried by it by means of clamp screws 133 and hand wheel 132 may be used to adjust the point of cut-off by cam lift 150 to correspond to adjusted positions of the cross-feed tape release dog 205 which as noted, is adjusted longitudinally along plate 176 for wide or narrow webs and tapes.

When it is desired to use the wrapping machine without the tear tape applicator, screw pin 229 can be backed out of engagement with disk 231 to stop the drive to the tear tape applier and shafts 16 and 130. Link 255 (FIG. 2) may be moved to position pin 256 in notch 237 thus rocking lever 238 and shaft 239 to raise the backing pressure roll 28 on arm 29. When the link is engaged as shown, oscillation of shaft 24 raises and lowers the backing roll with each tape application.

What is claimed as new is:

1. In combination with a wrapper feed and cutting machine having feed rolls and a cutter continuously driven to forward a web of wrapping material, tear tape applying mechanism comprising, a support plate projecting from the side of said machine and transverse to the path of advance of said web, a first lower drive shaft on the side of said plate connected to and driven in timed relation by said machine, an upper cam shaft supported on the side of said plate and connected to said first shaft to be driven thereby, a through shaft journaled in said plate perpendicular to said first shaft and driven thereby, a supply roll of tear tape material supported on said plate, a tape feeding roll mounted on said plate and having a continuous adjustable driving connection to said through shaft, guide rollers arranged to direct a strand of tape material over said tape feeding roll from said supply roll, a pressure roll holding said strand in feeding relation to said feeding roll, a solenoid cennected to withdraw said pressure roll from strand feeding relation, a slack take-up dancer roll rotatably and slidably mounted on said plate, other guide rolls mounted on said plate and adapted to direct said strand around said dancer roll to a cut-off position, one of said other guide rolls being adjustable to vary the length of said strand from said drive roll to said cut-off position, switches actuated in lowered and raised positions of said dancer roll connected to activate said solenoid to move said pressure roll to stop and start feeding positions respectively, an adhesive wax well supported on said plate, an applicator wheel rotatably mounted on said plate with its lower side dipping into said well and its upper side in contacting relation to one side of said strand between said dancer roll and said adjustable guide roll, another drive connection from said through shaft connected to rotate said applicator wheel with its upper strand contacting surface moving oppositely to said strand, a lift element engageable with said strand to lift the strand off of said wheel, a first carrier block slidably supported on said plate, an axially variable cam on said cam shaft arranged to reciprocate said first carrier block toward and away from the web in said machine by means of a follower lever pivoted on said plate and connected to said carrier block, a fixed shear on the outer end of said carrier block, a holding block slidably supported on said carrier block and movable thereon in response to movement of the carrier block by means of a lever fixedly pivoted to said carrier block and having one end drivingly engageable with said holding block and one end engageable with a fixed pivot on said plate, a vacuum chamber formed in said holding block and having strand securing openings formed in the upper side of the chamber, a cut-off blade connected to a rock shaft slidable with said first carrier block and spring biased to open noncutting position of the blade, a second radial cam on said cam shaft positioned to close said shear blade on said carrier block to sever a tear strip from said strand in the retracted position of said axial cam and said carrier block, a third axial cam on said cam shaft having a lift positioned to raise said lift element prior to actuation of said shear blade, a catch engageable with said raised lift element, a fourth angularly adjustable radial cam on said cam shaft having a lift positioned to disengage said catch, and a conveyor extending transversely of said machine below said web and having a gripper arranged to grip the unwaxed end of said strand from the advanced position of said carrier block and slide block and pull a tear strip length of the strand from said dancer roll and holding block for application to the side of said moving web while said cam shaft is making a single rotation of said cams.

2. In combination with a wrapper feed and cutting machine having feed rolls and a cutter driven to forward a web of wrapping material, tear tape applying mechanism comprising, a support plate projecting from the side of said machine and transverse to the path of advance of said web, a first drive shaft on the side of said plate connected to and driven in timed relation by said machine, a cam shaft supported on the side of said plate and connected to said first shaft to be driven thereby, a through shaft journaled in said plate perpendicular to said first shaft and driven thereby, a tape feeding roll mounted on said plate and having a continuous adjustable driving connection to said through shaft, guide rollers arranged to direct a strand of tape material over said tape feeding roll, a pressure roll holding said strand in feeding relation to said feeding roll, a solenoid connected to withdraw said pressure roll from strand feeding relation, a slack take-up dancer roll rotatably and slidably mounted on said plate, other guide rolls mounted on said plate and adapted to direct said strand around said dancer roll to a cut-off position, one of said other guide rolls being adjustable to vary the length of said strand from said drive roll to said cut-off position, switches actuated in lowered and raised positions of said dancer roll connected to activate said solenoid to move said pressure roll to stop and start feeding positions respectively, an adhesive wax well supported on said plate, an applicator wheel rotatably mounted on said plate with its lower side dipping into said well and its upper side in contacting relation to one side of said strand between said dancer roll and said adjustable guide roll, another drive connection from said through shaft connected to rotate said applicator wheel with its upper strand contacting surface moving oppositely to said strand, a lift element engageable with said strand to lift the strand off of said wheel, a first carrier block slidably supported on said plate, an axially variably cam on said cam shaft arranged to reciprocate said first carrier block toward and away from the web in said machine, a fixed shear on the outer end of said carrier block, a holding block slidably supported on said carrier block and movable thereon in response to movement of the carrier block, a vacuum chamber formed in said holding block and having strand securing openings formed in the upper side of the chamber, a cut-off shear blade connected to a rock shaft slidable with said first carrier block and spring biased to open noncutting position of the blade, a second radial cam on said cam shaft positioned to close said shear blade on said carrier block to sever a tear strip from said strand in the retracted position of said axial cam and said carrier block, a third axial cam on said cam shaft having a lift positioned to raise said lift element prior to actuation of said shear blade, a catch engageable with said raised lift element, a fourth angularly adjustable radial cam on said cam shaft having a lift positioned to disengage said catch, a conveyor extending transversely of said machine below said web and having a gripper arranged to grip the unwaxed end of said strand from the advanced position of said carrier block and holding block and pull a tear strip length of the strand from said dancer roll and holding block for application to the side of said moving web while said cam shaft is making a single rotation of said cams.

3. In combination with a wrapper feed and cutting machine having feed rolls and a cutter continuously driven to forward a web of wrapping material, tear tape applying mechanism comprising, a support plate projecting from said machine, a first drive shaft on the side of said plate connected to and driven in timed relation by said machine, a cam shaft supported on the side of said plate and connected to said first shaft to be driven thereby, a through shaft journaled in said plate perpendicular to said first shaft and driven thereby, a source of tear tape material supported on said plate, a tape feeding roll mounted on said plate and having a continuous driving connection to said through shaft, guide rollers arranged to direct a strand of tape material over said tape feeding roll from said source, a pressure roll holding said strand in feeding relation to said feeding roll, a solenoid connected to withdraw said pressure roll from strand feeding relation, a slack take-up dancer roll rotatably and slidably mounted on said plate, other guide rolls mounted on said plate and adapted to direct said strand around said dancer roll to a cut-off position, one of said other guide rolls being adjustable, switches actuated in lowered and raised positions of said dancer roll connected to activate said solenoid to move said pressure roll to stop and start feeding positions respectively, an adhesive wax well supported on said plate, an applicator wheel rotatably mounted on said plate with its lower side dipping into said well and its upper side in contacting relation to one side of said strand between said dancer roll and said adjustable guide roll, another drive connection from said first drive shaft connected to rotate said applicator wheel, a lift element engageable with said strand to lift the strand off of said wheel, a first carrier block slidably supported on said plate, an axially varying cam on said cam shaft arranged to reciprocate said first carrier block toward and away from the web in said machine by means of a follower lever pivoted on said plate and connected to said carrier block, a fixed shear on the outer end of said carrier block, a holding block slidably supported on said carrier block and movable thereon in response to movement of the carrier block by means of a lever fixedly pivoted to said carrier block and having one end drivingly engageable with said holding block and one end engageable with a fixed pivot on said plate, a vacuum chamber formed in said holding block and having strand securing openings formed in the upper side of the chamber, a cut-off blade connected to a rock shaft slidable with said first carrier block and spring biased to open noncutting position of the blade, a second radial cam on said cam shaft positioned to close said shear blade on said fixed shear to sever a tear strip from said strand in the retracted position of said axial cam and said carrier block, a third axial cam on said cam shaft hving a lift positioned to rise said lift element prior to actuation of said shear blade, a catch engageable with said raised lift element, a fourth angularly adjustable radial cam on said cam shaft having a lift positioned to disengage said catch, and a conveyor extending transversely of said machine below said web and having a gripper arranged to grip the unwaxed end of said strand from the advanced position of said carrier block and slide block and pull a tear strip length of the strand from said dancer roll and holding block from application to the side of said moving web while said cam shaft is making a single rotation of said cams.

4. In combination with a wrapper feed and cutting machine having feed rolls and a cutter continuously driven tc forward a web of wrapping material, tear tape applying mechanism comprising, a support plate projecting from said machine, a first drive shaft on the side of said plate connected to and driven in timed relation by said machine, a cam shaft supported on the side of said plate and connected to said first shaft to be driven thereby, a through shaft journaled in said plate perpendicular to said first shaft and driven thereby, a source of tear tape material supported on said plate, a tape feeding roll mounted on said plate and having a continuous driving connection to said through shaft, guide rollers arranged to direct a strand of tape material over said tape feeding roll from said source, a pressure roll holding said strand in feeding relation to said feeding roll, a solenoid connected to withdraw said pressure roll from strand feeding relation, a slack take-up dancer roll rotatably and slidably mounted on said plate, other guide rolls mounted on said plate and adapted to direct said strand around said dancer roll to a cut-off position, one of said other guide rolls being adjustable, switches actuated in lowered and raised positions of said dancer roll connected to activate said solenoid to move said pressure roll to stop and start feeding positions respectively, an adhesive well supported on said plate, an applicator wheel rotatably mounted on said plate with its lower side dipping into said well and its upper side in contacting relation to one side of said strand between said dancer roll and said adjustable guide roll, another drive connection from said first drive shaft connected to rotate said applicator wheel, a lift element engageable with said strand to lift the strand off of said wheel, a first carrier block slidably supported on said plate, a first cam on said cam shaft arranged to reciprocate said first carrier block toward and away from the web in said machine,
a fixed shear on the outer end of said carrier block,
a holding block slidably supported on said carrier block and movable thereon in response to movement of the carrier block by means of a lever fixedly pivoted to said carrier block and having one end drivingly engageable with said holding block and one end engageable with a fixed pivot on said plate,
a vacuum chamber formed in said holding block and having strand securing openings formed in the upper side of the chamber,
a cut-off blade connected to a rock shaft slidable with said first carrier block and spring biased to open noncutting position of the blade,
a second cam on said cam shaft positioned to close said shear blade on said fixed shear to sever a tear strip from said strand in the retracted position of said first cam and said carrier block,
a third cam on said cam shaft having a lift positioned to raise said lift element prior to actuation of said shear blade,
a catch engageable with said raised lift element,
a fourth cam on said cam shaft having a lift positioned to disengage said catch,
and a conveyor extending transversely of said machine below said web and having a gripper arranged to grip the uncoated end of said strand from the advanced position of said carrier block and slide block and pull a tear strip length of the strand from said dancer roll and holding block from application to the side of said moving web while said cam shaft is making a single rotation of said cams.

5. In combination with a wrapper feed and cutting machine having feed rolls and a cutter driven to forward a web of wrapping material, tear tape applying mechanism comprising,
a support plate projecting from said machine generally normal to the path of advance of said web,
a cam shaft on one side of said plate connectable to and driven in a one to one cycle timed relation by said machine,
means for varying the rotational angular relation between said shaft and said machine,
a tape feeding roll mounted on said plate and having a continuous adjustable driving connection with said cam shaft,
guide rollers arranged to direct a strand of tape material over said tape feeding roll,
a pressure roll holding said strand in feeding relation to said feeding roll,
a solenoid connected to withdraw said pressure roll from strand feeding relation,
a slack take-up device mounted on said plate positioned to receive tape from said feeding roll,
other guide rolls mounted on said plate and adapted to direct said strand around said take-up device to a cut-off position,
one of said other guide rolls being adjustable to vary the length of said strand between said take-up device and said cut-off position,
switches actuated in extended and retracted positions of said take-up device connected to activate said solenoid to move said pressure roll to stop and start feeding positions respectively,
an adhesive well supported on said plate,
an applicator wheel rotatably mounted on said plate with its lower side dipping into said well and its upper side in contacting relation to one side of said strand between said take-up device and said adjustable guide roll,
another drive connection between said cam shaft and said wheel connected to rotate said wheel,
a lift element engageable with said strand to lift the strand off of said wheel,
a first carrier block slidably supported on said plate,
a first cam on said cam shaft arranged to reciprocate said first carrier block toward and away from the web in said machine,
a fixed shear on the outer end of said carrier block,
a holding block slidably supported on said carrier block and movable thereon in response to movement of the carrier block,
a vacuum chamber formed in said holding block and having strand retaining openings formed in the upper side of the chamber,
a cut-off shear blade connected to a rock shaft slidable with said first carrier block and spring biased to open noncutting position of the blade,
a second cam on said cam shaft positioned to close said shear blade on said shear block to sever a tear strip from said strand in the carrier block retracting position of said first cam,
a third cam on said cam shaft having a lift positioned to raise said lift element prior to actuation of said shear blade,
a catch engageable with said raised lift element,
a conveyor extending transversely of said machine below said web and having a gripper arranged to grip the uncoated end of said strand from the advanced position of said carrier block and holding block and pull a tear strip length of the strand from said take-up device and holding block for application to the side of said moving web while said cam shaft is making a single cycle rotation of said cams,
a fourth cam driven in timed relation to said machine and arranged to activate said conveyor through a single cycle of tape feeding movement before said second cam has actuated said shear blade,
a fifth angularly adjustable cam on said cam shaft having a lift positioned to disengage said catch after said gripper has advanced a length of said tape,
a presser block movably positioned along the underside of the path of the web through said machine and along the path of said gripper,
gripper opening means adjustably positioned along the path of said gripper and the length of said presser block,
and a sixth cam driven in timed relation to said machine and connected to move said presser block upwardly against said web after said shear blade has operated to sever an individual tear strip from said tape material,
said presser block having suction ports therein adapted to hold said tear strip in position until contacted by said web.

6. In combination with a wrapper feed and cutting machine having feed rolls and a cutter driven to forward a web of wrapping material, tear tape applying mechanism comprising,
a support plate projecting from said machine generally normal to the path of advance of said web,
a cam shaft on said plate connectable to and driven at an integral multiple of the cycle of said machine by said machine,
means for varying the rotational angular relation between said shaft and said machine,
a tape feeding roll mounted on said plate and having a continuous driving connection with said cam shaft,
guide rollers arranged to direct a strand of tape material over said tape feeding roll,
a pressure roll holding said strand in feeding relation to said feeding roll,
a solenoid connected to withdraw said pressure roll from strand feeding relation,
a slack take-up device mounted on said plate positioned to receive tape from feeding roll,
other guide rolls mounted on said plate and adapted to direct said strand around said take-up device to a cut-off position, one of said other guide rolls being adjustable to vary the length of said strand between said take-up device and said cut-off position, switches actuated in extended and retracted positions of said take-up device connected to activate said solenoid to move said pressure roll to stop and start feeding positions respectively, an adhesive well supported on said plate, an applicator wheel rotatably mounted on said plate with its lower side dipping into said well and its upper side in contacting relation to one side of said strand between said take-up device and said adjustable guide roll, another drive connection between said cam shaft and said wheel connected to rotate said wheel, a lift element engageable with said strand to lift the strand off of said wheel, a first carrier block slidably supported on said plate, a first cam on said cam shaft arranged to reciprocate said first carrier block toward and away from the web in said machine, a fixed shear on the outer end of said carrier block, a holding block slidably supported on said carrier block and movable thereon in response to movement of the carrier block, a vacuum chamber formed in said holding block and having strand retaining openings formed in the side of the chamber, a cut-off shear blade connected to a rock shaft slidable with said first carrier block and biased to open non-cutting position of the blade, a second cam on said cam shaft positioned to close said shear blade on said shear block to sever a tear strip from said strand in the carrier block retracting position of said first cam, a third cam on said cam shaft having a lift positioned to raise said lift element prior to actuation of said shear blade, a catch engageable with said raised lift element, a conveyor extending transversely of said machine below said web and having a gripper arranged to grip the uncoated end of said strand from the advanced position of said carrier block and holding block and pull a tear strip length of the strand from said take-up device and holding block for application to the side of said moving web while said cam shaft is making a single cycle rotation of said cams, a fourth cam driven in timed relation to said machine and arranged to activate said conveyor through a single cycle of tape feeding movement before said second cam has actuated said shear blade, a fifth cam on said cam shaft having a lift positioned to disengage said catch after said gripper has advanced a length of said tape, a presser block movably positioned along the path of the web through said machine and along the path of said gripper, gripper opening means positioned along the path of said gripper and the length of said presser block, and a sixth cam driven in timed relation to said machine and connected to move said presser block against said web after said shear blade has operated to sever an individual tear strip from said tape material, said presser block having suction ports therein adapted to hold said tear strip in position until contacted by said web.

7. In combination with a wrapping machine having a wrapper sheet cut-off and wrapper web feed, means for applying a tear tape strip to each wrapper sheet length of said web as the web is advanced comprising, a source of tear tape material, a tape feed means driven from said machine to forward approximately a tear strip length of said material during each wrapper sheet feeding cycle of said machine, a slack take-up means receiving and guiding said strip length, other guide means directing said tape material from said take-up means to a cut-off position, shear means adapted to cut said strip length from the leading end of said material at said cut-off position and connected to be actuated in timed relation once in each cycle of said machine, adhesive applying means positioned to apply a layer of adhesive to one side of said material between said take-up means and said shear means, end advancing means including a holding block having suction ports therein and movable toward said shear means, a drive connected to advance said end advancing means after each actuation of said shear means to project the leading end of said tape material beyond said shear means and retract said end advancing means prior to the next actuation of said shear means, a fixed holding means including a second holding block having suction ports therein in the path of said tape material and adjacent the back of the retracted position of said end advancing means, a strip forwarding conveyor extending transversely under the path of said web and having tape gripping jaws thereon, cyclically operating drive means having on and off periods driven from said machine and arranged to advance said jaws from adjacent said shear means across the width of said wrapper feed, jaw opening means movably positioned to open said jaws adjacent said shear means to receive the projected end of said tape material, a spring pressed pawl yieldingly supported adjacent said conveyor and engageable therewith to locate said jaws in position to receive said projected end of said material, a release element connected to retract said jaw opening means after said projecting end has been projected therebetween and to retract said pawl prior to starting of said cyclically operating drive means, a second jaw opening means adjustable transversely of said web feed and in the path of said jaws to open said jaws as said conveyor is advancing, a movable presser bar positioned along the path of said grippers and having suction ports adapted to hold the uncoated side of said tape material after said grippers are opened, and a drive connection from said machine arranged to move said presser bar and a tear strip held thereby against said web during the off period of said cyclically operating drive means and after said shear means have operated, said shear means actuating connection, said drive to said end advancing means, said cyclically operating drive means, said release element connection and said drive connection to said presser bar being adjustable relative to said machine to operate at different points in the web feeding cycle of said machine.

8. In combination with a wrapping machine having a wrapper sheet cut-off and wrapper web feed, means for applying a tear tape strip to each wrapper sheet length of said web as the web is advanced comprising, a source of tear tape material, a tape feed means driven from said machine to forward approximately a tear strip length of said material during each wrapper sheet feeding cycle of said machine,
a slack take-up means receiving and guiding said strip length,
other guide means directing said tape material from said take-up means to a cut-off position,
shear means adapted to cut said strip length from the leading end of said material at said cut-off position and connected to be actuated in timed relation once in each cycle of said machine,
adhesive applying means positioned to apply a layer of adhesive to one side of said material between said take-up means and said shear means,
end advancing means movable toward said shear means,
a drive connected to advance said end advancing means after each actuation of said shear means to project the leading end of said tape material beyond said shear means and retract said end advancing means prior to the next actuation of said shear means,
a fixed holding means in the path of said tape material and adjacent the back of the retracted position of said end advancing means,
a strip forwarding conveyor extending transversely of the path of said web and having tape gripping jaws thereon,
cyclically operating drive means having on and off periods driven from said machine and arranged to advance said jaws from adjacent said shear means across the width of said wrapper feed,
jaw opening means movably positioned to open said jaws adjacent said shear means to receive the projected end of said tape material,
a pawl supported adjacent said conveyor and engageable therewith to locate said jaws in position to receive said projected end of said material,
a release element connected to retract said jaw opening means after said projecting end has been projected therebetween and to retract said pawl prior to starting of said cyclically operating drive means,
a second jaw opening means adjustable transversely of said web feed and in the path of said jaws to open said jaws as said conveyor is advancing,
a movable presser bar positioned along the path of said grippers and having suction ports adapted to hold the uncoated side of said tape material after said grippers are opened,
and a drive connection from said machine arranged to move said presser bar and a tear strip held thereby against said web during the off period of said cyclically operating drive means and after said shear means have operated,
said shear means actuating connection, said drive to said end advancing means, said cyclically operating drive means, said release element connection and said drive connection to said presser bar being adjustable relative to said machine to operate at different points in the web feeding cycle of said machine.

9. In combination with a wrapping machine having a wrapper sheet cut-off and wrapper web feed,
means for applying a tear tape strip to each wrapper sheet length of said web as the web is advanced comprising,
a source of tear tape material,
a tape feed means driven from said machine to forward approximately a tear strip length of said material during each wrapper sheet feeding cycle of said machine,
a slack take-up means receiving and guiding said strip length,
other guide means directing said tape material from said take-up means to a cut-off position,
shear means adapted to cut said strip length from the leading end of said material at said cut-off position and connected to be actuated in timed relation once in each cycle of said machine,
adhesive applying means positioned to apply a layer of adhesive to one side of said material between said take-up means and said shear means,
end advancing means movable toward said shear means,
a drive connected to advance said end advancing means after each actuation of said shear means to project the leading end of said tape material beyond said shear means and retract said end advancing means prior to the next actuation of said shear means,
a strip forwarding conveyor extending transversely of the path of said web and having tape gripping jaws thereon,
cyclically operating drive means having on and off periods driven from said machine and arranged to advance said jaws from adjacent said shear means across the width of said wrapper feed,
jaw opening means movably positioned to open said jaws adjacent said shear means to receive the projected end of said tape material,
a pawl supported adjacent said conveyor and engageable therewith to stop said conveyor and locate said jaws in position to receive said projected end of said material,
a release element connected to retract said jaw opening means after said projecting end has been projected therebetween and to retract said pawl prior to starting of said cyclically operating drive means,
a second jaw opening means adjustable transversely of said web feed and in the path of said jaws to open said jaws as said conveyor is advancing,
said other guide means being adjustable to fix the length of said material between said adhesive applying means and said shear means equal to the length of the tear strip advanced by said conveyor,
a movable presser bar positioned along the path of said grippers and having suction ports adapted to hold the uncoated side of said tape material after said grippers are opened,
and a drive connection from said machine arranged to move said presser bar and a tear strip held thereby against said web during the off period of said cyclically operating drive means and after said shear means have operated,
said shear means actuating connection, said drive to said end advancing means, said cyclically operating drive means, said release element connection and said drive connection to said presser bar being adjustable relative to said machine to operate at different points in the web feeding cycle of said machine.

10. In combination with a wrapping machine having a wrapper sheet cut-off and wrapper web feed,
means for applying a tear tape strip to each wrapper sheet length of said web as the web is advanced comprising,
a source of tear tape material,
a tape feed means driven from said machine to forward approximately a tear strip length of said material during each wrapper sheet feeding cycle of said machine,
a slack take-up means receiving and guiding said strip length,
other guide means directing said tape material from said take-up means to a cut-off position, shear means adapted to cut said strip length from the leading end of said material at said cut-off position and connected to be actuated in timed relation once in each cycle of said machine,
adhesive applying means positioned to apply a layer of adhesive to one side of said material between said take-up means and said shear means,
end advancing means movable toward said shear means,
a drive connected to advance said end advancing means after each actuation of said shear means to project the leading end of said tape material beyond said shear means and retract said end advancing means prior to the next actuation of said shear means,
a strip forwarding conveyor extending transversely of the path of said web and having tape gripping jaws thereon,
drive means including an overrunning drive connection driven from said machine and arranged to advance said jaws from adjacent said shear means across the width of said wrapper feed,
jaw opening means movably positioned to open said jaws adjacent said shear means to receive the projected end of said tape material,
a pawl supported adjacent said conveyor and en-engageable therewith to stop said conveyor and locate said jaws in position to receive said projected end of said material,
a release element connected to retract said jaw opening means after said projecting end has been projected therebetween and to retract said pawl,
a second jaw opening means adjustable transversely of said web feed and in the path of said jaws to open said jaws as said conveyor is advancing,
said other guide means being adjustable to fix the length of said material between said adhesive applying means and said shear means equal to the length of the tear strip advanced by said conveyor,
a movable presser bar positioned along the path of said grippers and having suction ports adapted to hold the uncoated side of said tape material after said grippers are opened,
and a drive connection from said machine arranged to move said presser bar and a tear strip held thereby against said web after said jaw means have cleared said presser bar after said shear means have operated,
said shear means actuating connection, said drive to said end advancing means, said conveyor drive means, said release element connection and said drive connection to said presser bar being adjustable relative to said machine to operate at different points in the web feeding cycle of said machine.

11. In combination with a wrapping machine having a wrapper sheet cut-off and wrapper web feed,
means for applying a tear tape strip to each wrapper sheet length of said web as the web is advanced comprising,
a source of tear tape material,
a tape feed means driven from said machine to forward approximately a tear strip length of said material during each wrapper sheet feeding cycle of said machine,
a slack take-up means receiving and guiding said strip length,
other guide means directing said tape material from said take-up means to a cut-off position,
shear means adapted to cut said strip length from the leading end of said material at said cut-off position and connected to be actuated in timed relation once in each cycle of said machine,
adhesive applying means positioned to apply a layer of adhesive to one side of said material between said take-up means and said shear means,
end advancing means including a holding block having suction ports therein and movable toward said shear means,
a drive connected to advance said end advancing means after each actuation of said shear means to project the leading end of said tape material beyond said shear means and retract said end advancing means prior to the next actuation of said shear means,
a fixed holding means including a second holding block having suction ports therein in the path of said tape material and adjacent the back of the retracted position of said end advancing means,
a strip forwarding conveyor extending transversely under the path of said web and having tape gripping jaws thereon,
cyclically operating drive means having on and off periods driven from said machine and arranged to advance said jaws from adjacent said shear means across the width of said wrapper feed,
jaw opening means movably positioned to open said jaws adjacent said shear means to receive the projected end of said tape material,
a spring pressed pawl yieldingly supported adjacent said conveyor and engageable therwith to locate said jaws in position to receive said projected end of said material,
a release element connected to retract said jaw opening means after said projecting end has been projected therebetween and to retract said pawl prior to starting of said cyclically operating drive means,
a second jaw opening means adjustable transversely of said web feed and in the path of said jaws to open said jaws as said conveyor is advancing,
a movable presser bar positioned along the path of said grippers and having suction ports adapted to hold the uncoated side of said tape material after said grippers are opened,
adhesive skip means arranged to periodically disengage said tape from said adhesive applying means,
actuating connections between adhesive skip means and said drive to said end advancing means arranged to disengage said tape material from said applying means prior to stopping of said cyclically operated drive means and deactivate said skip means after partial advance of said conveyor,
and a drive connection from said machine arranged to move said presser bar and a tear strip held thereby against said web during the off period of said cyclically operating drive means and after said shear means have operated,
said shear means actuating connection, said drive to said end advancing means, said cyclically operating drive means, said release element connection and said drive connection to said presser bar being adjustable relative to said machine to operate at different points in the web feeding cycle of said machine.

12. A tear tape strip applying mechanism cooperative with a wrapping machine having a wrapper web feed and wrapper sheet cutter comprising,
a source of tear tape material,
a tear tape forwarding conveyor extending transversely of said wrapper web and having gripper jaw means adapted to pull a tear strip length of said material from said source transversely of said web,
a constantly driven material feed and slack take-up means operative on said material between said source and said conveyor,
means positioned between said source and said conveyor for rendering one side of said material adhesive to the web being fed through said web feed,
adjustable guide means cooperative with said material between said conveyor and said means for rendering said material adhesive to vary the length of material therebetween,
intermittently operated means including a tape lifter arranged to interrupt said adhesive rendering means,
a shear blade positioned to cut said material adjacent said conveyor,
an end forwarding holder positioned to project the severed leading end of said material beyond said shear blade,
a first jaw control operable between jaw opening and jaw closing positions and located to operate on said jaw means at the projected end of said material,
a second jaw control adjustable across the width of said web feed and adapted to open said jaw means,
a tear strip applying bar extending along the path of said jaw means and having suction ports for holding a tear strip severed from said material,
means for moving said bars to press said adhesive surface of said strip against said web while said web is moving,
a first drive connection connectable to said machine and angularly adjustable in the cycle thereof and connected to drive said conveyor through a tape advancing cycle in less than the wrapper sheet feeding and cutting cycle of said machine and stop said conveyor during the remainder of the machine cycle,
a second drive connection connected to said first drive connection and angularly adjustable relative thereto,
means connecting said intermittently operated means to said second drive connection to variably render said adhesive rendering means operative,
means connecting said shear blade to said second drive means to operate said shear blade during the inoperative portion of the cycle of said adhesive rendering means,
means connecting said end forwarding means to said second drive means to advance the holder after actuation of said shear blade and retract the holder after the start of said forwarding conveyor,
means connecting said first jaw control to said first drive connection to open said jaw means at the end of the advancing cycle of said conveyor and before the advancing cycle of said end forwarding means,
said last connecting means being operative to move said first jaw control to jaw closing position prior to advance of said conveyor,
and means connecting said means for moving said bar to said first drive means to advance said bar to strip applying position after said conveyor has stopped.

13. A tear tape strip applying mechanism cooperative with a wrapping machine having a wrapper web feed and wrapper sheet cutter comprising,
a source of tear tape material,
a tear tape forwarding conveyor extending transversely of said wrapper web and having gripper jaw means adapted to pull a tear strip length of said material from said source transversely of said web,
means positioned between said source and said conveyor for rendering one side of said material adhesive to the web being fed through said web feed,
adjustable guide means cooperative with said material between said conveyor and said means for rendering said material adhesive to vary the length of material therebetween,
intermittently operated means arranged to interrupt said adhesive rendering means,
a shear blade positioned to cut said material adjacent said conveyor,
an end forwarding holder positioned to project the severed leading end of said material beyond said shear blade,
a first jaw control operable between jaw opening and jaw closing positions and located to operate on said jaw means at the projected end of said material,
a second jaw control adjustable across the width of said web feed and adapted to open said jaw means,
a tear strip applying bar extending along the path of said jaw means and having suction ports for holding a tear strip severed from said material,
means for moving said bar to press said adhesive surface of said strip against said web,
a first drive connection connectable to said machine and connected to drive said conveyor through a tape advancing cycle in less than the wrapper sheet feeding and cutting cycle of said machine and stop said conveyor during the remainder of the machine cycle,
a second drive connection connected to said first drive connection,
means connecting said intermittently operated means to said second drive connection to render said adhesive rendering means operative,
means connecting said shear blade to said second drive means to operate said shear blade during the inoperative portion of the cycle of said adhesive rendering means,
means connecting said end forwarding means to said second drive means to advance the holder after actuation of said shear blade and retract the holder after the start of said forwarding conveyor,
means connecting said first jaw control to said first drive connection to open said jaw means at the end of the advancing cycle of said conveyor and before the advancing cycle of said end forwarding means,
said last connecting means being operative to move said first jaw control to jaw closing position prior to advance of said conveyor,
and means connecting said means for moving said bar to said first drive means to advance said bar to strip applying position after said conveyor has stopped.

14. A tear tape strip applying mechanism cooperative with a wrapping machine having a wrapper web feed and wrapper sheet cutter comprising,
a source of tear tape material,
a tear tape forwarding conveyor extending transversely of said wrapper web and having gripper jaw means adapted to pull a tear strip length of said material from said source transversely of said web,
means positioned between said source and said conveyor for rendering one side of said material adhesive to the web being fed through said web feed,
adjustable guide means cooperative with said material between said conveyor and said means for rendering said material adhesive to vary the length of material therebetween,
intermittently operated means arranged to interrupt said adhesive rendering means,
a shear blade positioned to cut said material adjacent said conveyor,
an end forwarding holder positioned to project the severed leading end of said material beyond said shear blade,
a first jaw control operable between jaw opening and jaw closing positions and located to operate on said jaw means at the projected end of said material,
a second jaw control adjustable across the width of said web feed and adapted to open said jaw means,
a tear strip applying bar extending along the path of said jaw means and having suction ports for holding a tear strip severed from said material, means for moving said bar to press said adhesive surface of said strip against said web, a drive connection connectable to said machine and connected to drive said conveyor through a tape advancing cycle in less than the wrapper sheet feeding and cutting cycle of said machine, means connecting said intermittently operated means to said drive connection to render said adhesive rendering means operative, means connecting said shear blade to said drive means to operate said shear blade during the inoperative portion of the cycle of said adhesive rendering means, means connecting said end forwarding means to said drive means to advance the holder after actuation of said shear blade and retract the holder after the start of said forwarding conveyor, means connecting said first jaw control to said drive connection to open said jaw means at the end of the advancing cycle of said conveyor and before the advancing cycle of said end forwarding means, said last connecting means being operative to move said first jaw control to jaw closing position prior to advance of said conveyor, and means connecting said means for moving said bar to said drive means to advance said bar to strip applying position after said conveyor has stopped.

References Cited by the Examiner

UNITED STATES PATENTS 2,760,414 8/1956 Cornock et al. ---------- 93—1

BERNARD STICKNEY, *Primary Examiner.*